June 16, 1942.   F. W. KIDDER   2,286,628
PHOTOGRAPHIC DEVICE
Filed Jan. 29, 1940   2 Sheets-Sheet 1
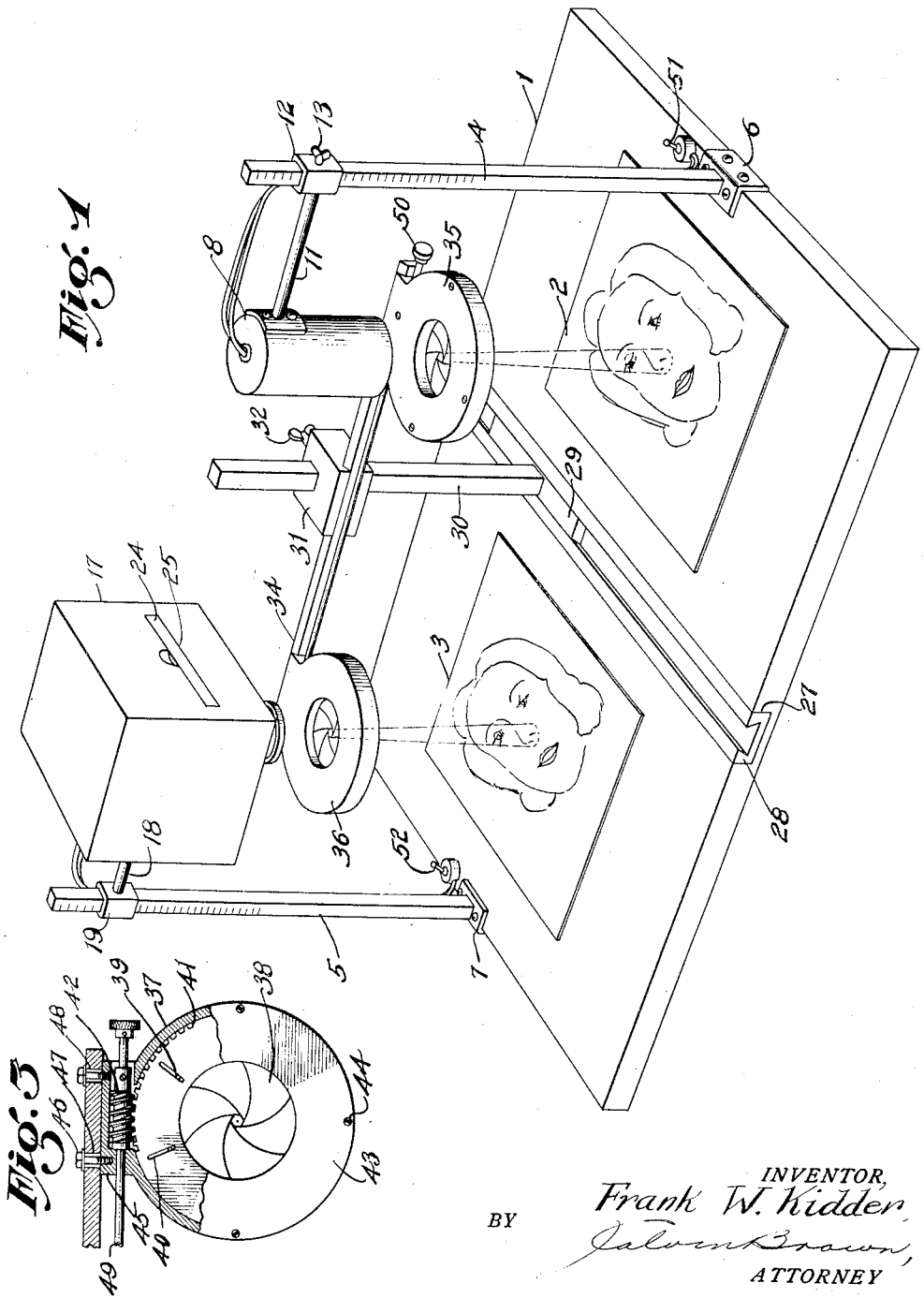
INVENTOR,
Frank W. Kidder,
BY
Calvin Brown,
ATTORNEY June 16, 1942.  F. W. KIDDER  2,286,628
PHOTOGRAPHIC DEVICE
Filed Jan. 29, 1940  2 Sheets-Sheet 2
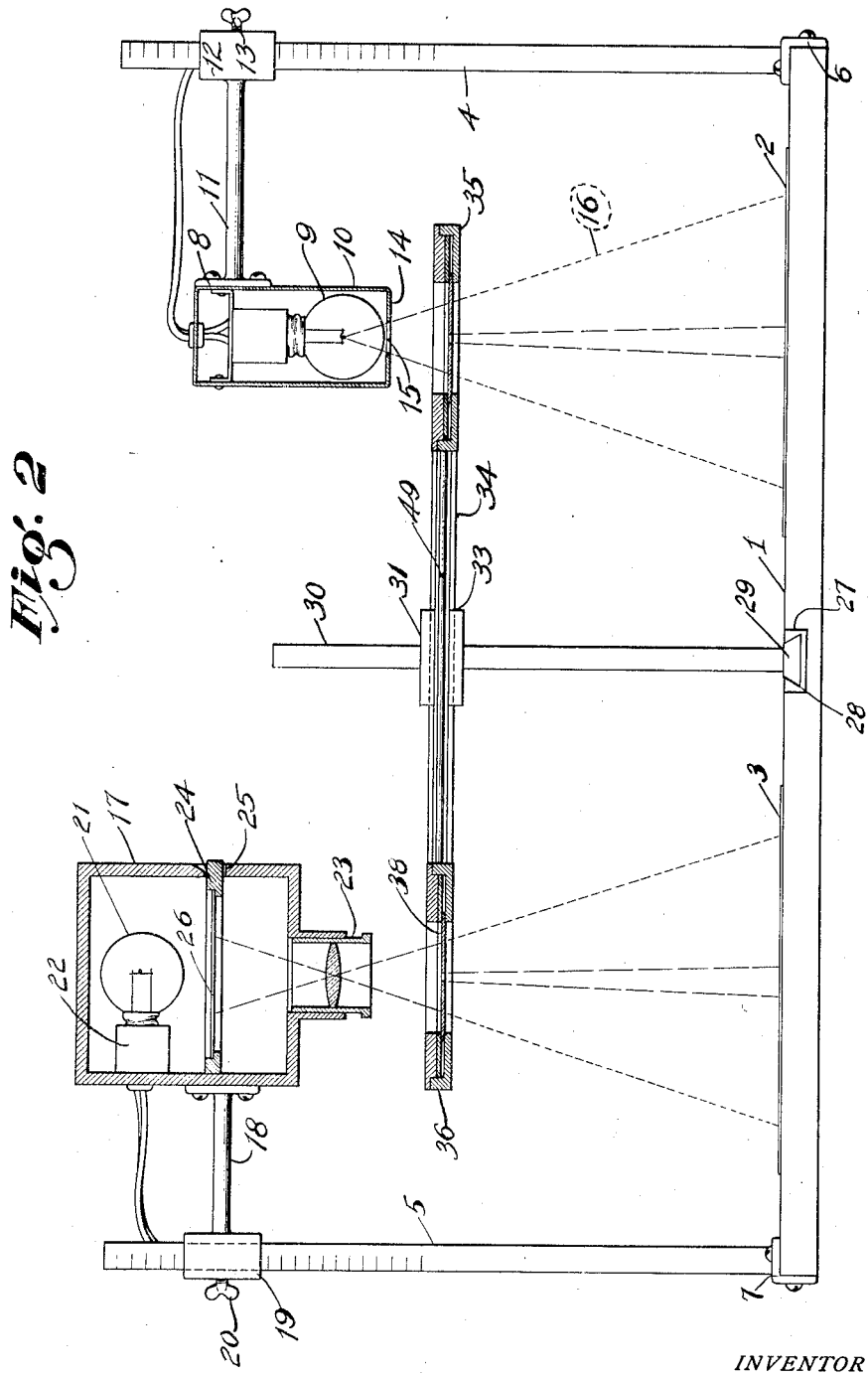
INVENTOR
Frank W. Kidder;
BY
ATTORNEY Patented June 16, 1942

2,286,628

UNITED STATES PATENT OFFICE 2,286,628

PHOTOGRAPHIC DEVICE

Frank W. Kidder, Los Angeles, Calif.

Application January 29, 1940, Serial No. 316,094

12 Claims. (Cl. 88—24)

This invention relates broadly to photographic devices of the type which ordinarily embody so-called "working up" of the negative or undeveloped positive.

The device of the present invention is adapted to either cause contrast in the undeveloped positive or negative, or to reduce contrast of any selected areas. The device has direct applicability for X-ray work, wherein a plate may have the contrast thereof increased or decreased so that bone fractures and the like may be brought out in detail. The invention also is useful for overcoming contrast in portraits. The inventor is aware that certain means have been suggested to skilled photographers in the printing of negatives of interposing in the beam of light some medium adapted to shadow a given area to reduce contrast. Light will "fog" a negative. Hence, with the present invention, I propose to selectively re-expose or control the re-exposure of any area that may be desired so that contrast is accentuated or reduced with respect to other areas of the same photograph.

The invention has for an object the provision of a device which is accurate, easily handled by an amateur, which will produce superior results, and in which the operator will at all times be able to determine in advance the outcome of the selective or controlled re-exposure operation on a negative or undeveloped positive.

Other objects include a device which is inexpensive in cost of manufacture and generally superior to the usual hand methods, including the use of a brush and suitable paints now generally used in the industry.

With the above mentioned and other objects in view, the invention consists in the novel and useful provision, formation, construction, association, and relative arrangement of parts, members and features, all as shown in a certain embodiment in the accompanying drawings, described generally, and more particularly pointed out in the claims.

In the drawings:

Figure 1 is a perspective view of the complete device,

Figure 2 is a vertical sectional view of certain elements of the device and showing the internal construction thereof, and, Figure 3 is a fragmentary view, partly in section, of certain mechanism of the device.

Referring now to the drawings, I have provided a work board 1 upon which may be placed a positive film 2 and an undeveloped positive 3 in such a manner that said positives may be in substantial parallelism. Graduated or scaled uprights 4 and 5 are secured in any approved manner, such as by brackets 6 and 7, to the board. The upright 4 has adjustably movable relative thereto a source of light 8. The source of light includes a light bulb 9 within a casing 10, a bracket 11 secured to the casing, and a slide 12 at one end of the bracket, together with any form of adjusting screw, such as the wing nut 13, carried by the slide, the said slide moving on the upright and held in any position relative to said upright and the scale thereof by adjusting the thumb nut 13. The casing 10 has a wall 14 formed with an aperture or opening 15 through which rays of light may pass from the said bulb 9, as indicated by the dotted lines 16, indicating the cone of light. The upright 5, which is graduated in a manner similar to the upright 4, is adapted to have adjustably movable thereon a housing 17 having a bracket 18 secured thereto and to one side thereof, which bracket has a slide 19 at one end, the said slide being movable upon the upright 5 and adjusted to position on said upright through the medium of a wing nut 20. The housing 17 has contained within the same a source of light 21 in the form of an electric light bulb suitably received in a socket 22, and an adjustable lens mount 23 in position to transmit the rays of light from the source of light outwardly of said mount.

Adapted to be interposed between the lens mount and the source of light 21 is a negative carrying frame 24. In this particular, the said housing is formed with a slot 25 in one of its walls whereby the negative frame containing a negative, such as shown at 26, may be inserted within the housing, as best shown in Figure 2. It is evident that when the source of light is in operation that the image on the said negative will be projected through the lens onto the board 1, and in the present instance, projected onto the undeveloped positive 3. The work board 1 is divided as to working areas by the same being transversely grooved at 27 to receive a dove-tail groove member 28. Movable within said dove-tail groove is a slide 29, which slide carries an upright 30. Slidably movable upon the upright is a block 31 adjustable as to position on said upright through the medium of any locking device, such as the wing nut 32. The block is formed with a dove-tail groove 33, and movable within said dove-tail groove 33 is a beveled bar 34. This bar is adapted to carry iris members 35 and 36. The iris members are dovetailed in Figure 3 and one thereof will be described.

Each iris member includes a housing 37 provided with a substantially annular side wall within which is placed overlapping iris leaves 38, each leaf of which is provided with an upstanding pin 39, received within radial slots 40 of an annular gear 41 and a worm 42 in mesh with the teeth of said gear, together with an annular cover plate 43 secured to the rim of the housing by any suitable means, such as by the screws 44. It will be noted that the housing is provided with an enlargement 45, whereby the said housing, through the medium of screws 46, is secured to the bar 34. Slight adjustment of the housing relative to the bar is permitted by enlarging the openings 47 and 48 through which the screws 46 pass. As stated, two of the iris members are provided and in order that the iris of each member should be simultaneously operated to produce like openings, an elongated shaft 49 extends between the iris members for joint operation of the worm gears mounted on said shaft. A finger knob 50 carried on one end of the shaft permits rotation of said shaft. The distance between centers of the iris is equal to the distance between the centers of the two light housings, and the height of the films from the source of light 9 is substantially equal to the center line of the lens in the lens mount 23.

The operation, uses and advantages of the invention are as follows:

If we assume that the area around the nose on the portrait exhibited in Figure 1 as 2 needs contrast, the negative of said portrait is placed in the housing 17 as shown at 26 in Figure 2. The iris openings are adjusted so that the cone of light just covers the area desired on the positive 2. Light passed through the negative 26 projected by the lens upon the undeveloped positive 3 will cover the same area as that covered by the cone of light on the positive 2'. The switches 51 and 52 control the electric circuits to the source of lights 9 and 21, respectively. Switch 51 is on and the switch 52 may be moved to an "on" position and left on the desired length of time, best indicated by experience of the operator. Light, of course, affects the area of the undeveloped positive being re-exposed. If it is desired to reduce or increase the contrast of some other area of the undeveloped positive 3, as indicated by the preliminary photograph or positive 2, the slide 29 may be moved within the dove-tail slot of member 28 and the beveled bar 34 may be moved within the slot 33 of block 31. Such movement will bring the center of the iris in iris member 35 away from the center of the source of light 9 and the light rays will nevertheless impinge upon the desired area of the photograph 2. Such movement produces simultaneous movement of the iris member 36 and the projected image from the negative will have all other light rays cut off, save and except the image bearing ray projected upon the selected area of the undeveloped positive 3. Thus, contrast may be increased or decreased with respect to other areas of the same undeveloped positive by the "fogging" effect of light.

To those skilled in the art of photography, the positioning of the source of light within the housings and the adjustment of the same on the uprights, together with the correct movement of the iris members, are readily understood without detailed instruction. The lens mount 23 is adjustable to bring the image rays into the proper focus with the undeveloped positive, or out of focus as may be desired, depending upon the effect to be produced upon the undeveloped positive.

It has been found that use of the device depicted and as described is capable of producing superior results, and particularly superior to results obtained by use of a paint brush for correcting or working up different areas of a photograph. I have purposely not detailed any particular method of holding the finished positive and the undeveloped positive in position upon the work board, as any suitable means may be provided for this purpose, such as spring clips, or the like.

I claim:

1. In a device of the character disclosed, a work board upon which may be positioned a finished positive which is to be corrected and an undeveloped positive; sources of light positioned over the finished positive and the undeveloped positive, iris members included between each source of light, and said positives, and means for simultaneously producing like adjustment of both iris members as to size and position to control the spread of each light cone.

2. In a device of the character disclosed, a work board, a slide movable transversely of said board, an upright upon said slide, a slide upon said upright, a bar carried by and movable relative to the slide on said upright, iris members spacedly carried by said bar, and means for simultaneously producing like adjustment of both iris members as to size and position; and independent sources of light adjustably positioned above the iris members.

3. In a device of the character disclosed, a work board, uprights carried at opposite sides of said work board, a source of light adjustably carried by one of said uprights, a housing adjustably carried by a second upright, a source of light within said housing, a lens with its mount secured to said housing forward of said source of light, and means whereby an image bearing film may be interposed in said housing between said source of light and the lens mount, in combination with a pair of iris members adapted for simultaneous like adjustment as to size and position positioned forwardly of the first source of light and the lens mount.

4. In a device of the character disclosed, a work board upon which may be placed two positives, one of which is to be corrected as to contrast; a pair of housings both provided with a source of light positioned above said work board, and means forward of each source of light and simultaneously adjustable as to size and position for covering with light like selected areas of both positives.

5. In a device of the character disclosed, a work board upon which is adapted to be disposed a finished positive and an undeveloped positive, a pair of iris members, means for supporting the iris members above the positives and simultaneously adjusting the same as to size and position, and sources of light adjustably positioned above said iris members.

6. In a device of the character disclosed, a work board upon which may be disposed a finished positive and an undeveloped positive, a pair of iris members, one of which is positioned above the finished positive and the other of which is positioned above the undeveloped positive, means for simultaneously moving both said iris members to any selected like position above the positives, means for simultaneously producing like opening and closing of both iris members and independent sources of light above each iris member, whereby dependent upon the positioning of both iris members and the openings in said iris members, a like light beam covers the same area of each positive.

7. In a device of the character disclosed, a work board adapted to have placed thereon a finished positive and an undeveloped positive in a defined relationship, a slide carried by said work board, an upright upon said slide, a second slide upon said upright, a bar carried by the second slide and adjustable relative thereto, and a pair of iris members spacedly carried by said bar; one iris member adapted to be adjustably positioned by both said slides over the finished positive to simultaneously position the other iris member over an identical area on the undeveloped positive, and means for simultaneously adjusting the iris members as to size.

8. In a device of the character disclosed, a work board, an upright upon said slide, a second finished positive and an undeveloped positive in a defined relationship, a slide carried by said work board, an upright upon said slide, a second slide upon said upright, a bar carried by the second slide and adjustable relative thereto, and a pair of iris members spacedly carried by said bar; one iris member adapted to be adjustably positioned by both said slides over the finished positive to simultaneously position the other iris member over an identical area on the undeveloped positive, and means for simultaneously adjusting the iris members as to size in combination with sources of light over both said iris members.

9. In a device of the character disclosed, a work board adapted to have placed thereon a finished positive and an unprinted positive in a defined relationship, a slide carried by said work board, an upright upon said slide, a second slide upon said upright, a bar carried by the second slide and adjustable relative thereto, a pair of iris members spacedly carried by said rod; one iris member adapted to be adjustably positioned by both said slides over the finished positive to simultaneously position the other iris member over an identical area on the unprinted positive, light housings positioned above both said iris members, one of said light housings provided with an adjustable lens, and said housing formed to receive a negative between the source of light and the said lens.

10. In a photographic device, a work board upon which is positioned a finished positive which is to be corrected as to contrast and an undeveloped positive, a source of light above said finished positive, means for projecting an image bearing light beam identical with the image on said finished positive onto said undeveloped positive, and means forward of the sources of light and the means for projecting the image bearing light and simultaneously adjustable as to position and size for covering with light like selected areas of both positives.

11. In a device of the character disclosed, a work board upon which is positioned a finished positive and an undeveloped positive, the finished positive of which is to be corrected as to contrast, a source of light above the finished positive, an iris member interposed between said source of light and said positive, means for projecting an image bearing light beam having identical characteristics to the finished positive upon said undeveloped positive, an iris member between said means and the undeveloped positive, and means between both said iris members for producing like adjustment as to position and size thereof to control the spread of each light cone, whereby contrast is effected on the undeveloped positive relative to the printed positive at any selected area.

12. In a photographic device as disclosed, a work board, a post shiftably carried by said work board, a shiftable block on said post, a bar carried by said block, and a pair of casings at ends of said bar; iris members within said casings, and means for producing simultaneous like opening and closing of both iris members.

FRANK W. KIDDER.